Figure 1:
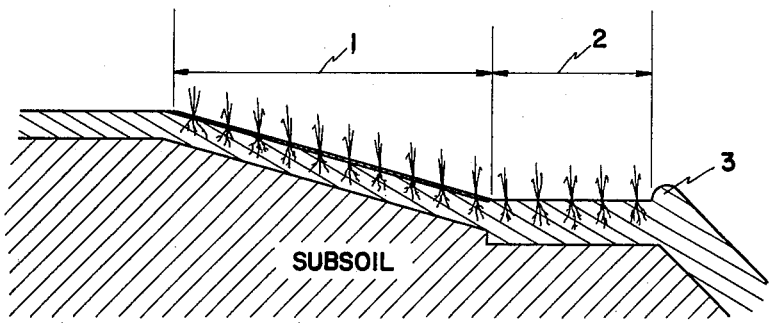

Henry J. Hibshman
Robert A. Louis     INVENTORS
Irven F. Wagner

BY Peter H. Smolka   PATENT ATTORNEY

3,061,975
ASPHALT MULCH APPLICATION IN LOW RAINFALL AREAS
Henry J. Hibshman, Plainfield, Robert A. Louis, Fanwood, and Irven F. Wagner, Rahway, N.J., assignors to Esso Research and Engineering Company, a corporation of Delaware
Filed Jan. 26, 1962, Ser. No. 169,145
12 Claims. (Cl. 47—9)

This invention relates to a method for increasing crop yields in semi-arid regions by a novel combination of techniques involving both diversion and conservation of naturally available moisture.

The present application is a continuation-in-part of Serial No. 854,163, filed November 19, 1959, and now abandoned, entitled "Method For Increasing Crop Yields in Low Rainfall Areas"; inventors: Henry J. Hibshman, Robert A. Louis, and Irven F. Wagner.

In particular this invention relates to a novel improved method for maximizing crop production from a given acreage in semi-arid regions which receive an insufficient amount of natural rainfall to insure seed germination and to sustain the growth of such crops without irrigation by conserving and judiciously utilizing the moisture coming to such acreage through natural means. In accordance with the present invention, crop yields are maximized utilizing an asphalt coating over a seeded portion of a seed bed to conserve moisture therein.

More particularly this invention relates to a novel combination of techniques including improved methods for the application and field arrangement of petroleum based coatings, preferably asphalt comprising mulches, over a contributing area of an acreage, the diversion of post application rainfall from such contributing area to a benched or receiving area and the growing of grasses and other crops simultaneously on both the contributing and receiving areas.

The terms "benched area" and "receiving" area are used herein to mean a leveled plateau of land at an elevation lower than any point on an adjacent sloped area from which rain is shed to or upon said benched area.

The term "contributing area" is used herein to mean the sloped area above a benched area from which rainfall flows by gravity to the benched area.

Millions of acres of potentially valuable crop lands in the western half of the United States along with areas even more vast in other countries normally do not receive sufficient rainfall to sustain crops. Imprudent cultivation in marginal cropping areas followed by wind erosion has only served to accentuate the problem. With proper moisture conservation techniques employed in combination with methods for maximizing the utilization of such moisture much of this land can be profitably employed to provide valuable crops such as corn, beans, sugar beets, cotton, sorghum and vegetable crops of a truck farming operation. The planting of crops upon lowlands which receive run-off water from a contributing area of higher elevation is, of course, as old as agriculture itself. Various techniques of coating watersheds with an asphalt layer to prevent erosion are also known to the art. In limited application various combinations of mulching material such as straw, cloth, fiber mats, etc. have been used with asphalt comprising mixtures to establish plant growth in the landscaping of terraces, etc.

The present invention involves a novel combination of these basic techniques which for the first time provides a method for maximizing agricultural production in low rainfall areas in a manner that is easily carried into application and which can be applied at a cost sufficiently low to make it economically feasible to apply this technique over large areas of land. If the problem hereinbefore described is to be solved, in order that the ever increasing world demands for foodstuffs be met, a technique for utilizing these wasted acres must hold to a minimum the materials necessary to place such lands in production and through such production obtain the highest possible yield per acre of treated area. This technique is highly advantageous in areas receiving an average rainfall between 3 and 30 inches, particularly between 6 and 18 inches, per year.

The present invention solves this problem by a series of steps in combination which include (1) seeding a contributing area while the moisture content of the soil is high, (2) coating the seeded contributing area with a continuous film of a petroleum based emulsion, preferably an asphalt comprising emulsion which upon drying is impenetrable to water or water vapors and of a thickness and consistency suitable for penetration by young plants and seedlings, (3) diverting the run-off of rainfall which occurs subsequent to such coating to a benched or receiving area which is also seeded and which is of a size controlled by the size of the contributing area and the conditions of rainfall in the region of application, and (4) the establishment of means to confine the run-off water from the contributing area to the benched area until the moisture requirements of the benched area are met.

To achieve the maximum plant growth from the available moisture the dimensions and overall geometry of the system must be carefully controlled. The ratio of coated to uncoated areas should be in the range of about 0.2/1 to 3.0/1, preferably about 0.3–1:1. A choice can be made within this range which is most realistic in view of the local rainfall conditions. Where this ratio falls below about 0.2:1 insufficient run-off is available to adequately supplement the moisture of the benched area. Where this ratio rises above about 3:1 the amount of asphalt required and the resulting cost per acre for the total producing area may render the technique economically unfeasible. The width of the coated area should be in the range of about 25 to 300 feet to provide a run-off which is sufficient to spread over the entire benched area and not sink in immediately adjacent to the coated area. The maximum width of the coated area should be such that the total flow of water across the contributing area does not destroy the coating through erosive action.

The success of these applications depends upon the storage of moisture in both the contributing area and the benched or receiving area. The maintenance of this moisture supply however, is effected by different means with respect to the two areas. In the case of the coated contributing area the coating is applied after seeding when the moisture content in the soil is high. This is preferably carried out as soon after the major seasonal rains as the ground is workable. The continuous asphalt film employed in this invention greatly reduces the loss of moisture from the soil through surface evaporation. It is known that a major loss of moisture from the soil during a growing season results from such evaporation. The films employed in this invention are capable of eliminating 90% or more of the moisture loss via this escape route. With this control the water in the soil at the time of seeding often is sufficient to sustain the crop planted on such area without appreciable replenishment. Some replenishment however will occur from adjacent uncoated soil during periods in which such soil is temporarily saturated during a heavy rain. When a rainfall occurs which is sufficient to temporarily saturate the top layer of soil the lateral movement of moisture is relatively rapid, i.e. at a rate of several inches per hour with some variance which is dependent upon the type of soil. When the rainfall ceases and the field drains or is otherwise depleted of moisture to the level of field capacity or below, the rate of lateral migration drops off sharply until such movement is negligible and for all practical purposes may be considered as non-existent. Thus, the moisture moving under the coating from the adjacent uncoated area in periods of saturation is trapped under the coating and will not be lost to any appreciable extent either by lateral movement or surface evaporation.

The maintenance of moisture in the benched or receiving area is effected by different means. The benched area is positioned and shaped to receive in addition to its normal share of rainfall the run-off water from the coated area from all rains falling after the coating of the contributing area. With suitable terracing the run-off can be confined to the benched area and held there until absorbed by this area. Means should be provided to permit the escape of unduly excessive run-offs at a time of unusually heavy rainfall. Thus by receiving a water supplement from the contributing area the actual moisture supply to the benched area can be doubled or tripled as the need may be to raise the normal amount of rainfall to a crop sustaining level. This technique can be employed most effectively in areas where the soil of the benched area is of sufficient depth to store moisture for relatively long periods of time. Preferably, such applications should be made where the soil depth above bedrock is at least 5 feet.

The coating of the contributing area with a controlled diversion of run-off water to the benched area will result in a vigorous crop growth on the latter area. The use of these coatings in accordance with the instant invention makes possible the growing of crops on the contributing area as well as on the benched area, and the combined cropping provides a maximum utilization of available field moisture thereby greatly increasing the yield.

The invention may be more easily understood by referring to the accompanying drawings which represent one embodiment of the methods described herein. FIGURE 1 represents a cross-sectional view of an irregular terrain wherein 1 is an asphalt coated contributing area having a total surface area approximately double the surface area of 2, a level or benched receiving area. Crops are being grown upon both the contributing area and the benched area. To insure entrapment of a major amount of run-off water from 1 in area 2 a soil terrace or berm 3 is provided to hold such water on the benched area until maximum absorption can take place.

Figure 2:
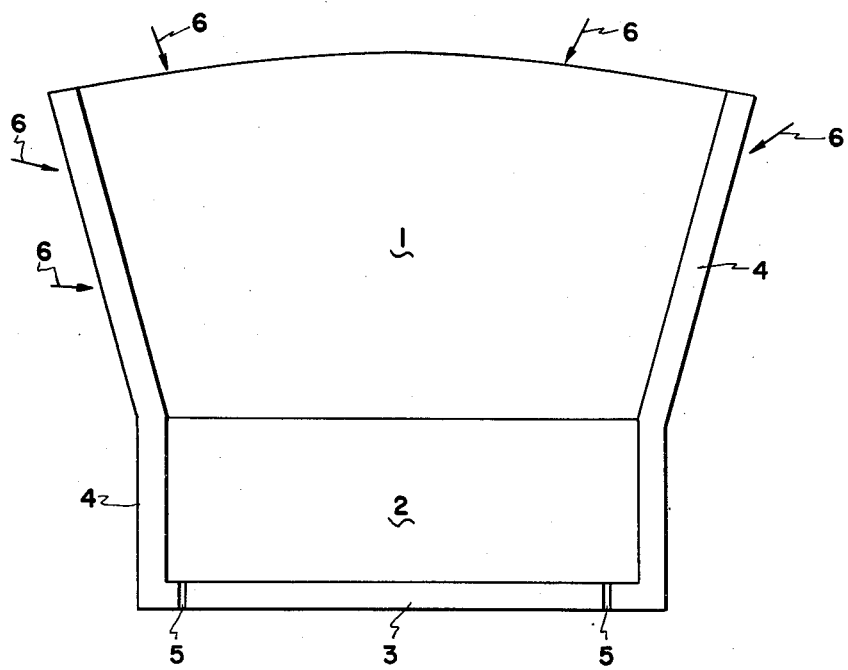

FIGURE 2 represents a view of such a growing unit looking over berm 3 toward contributing area 1. Additional terraces or berms 4 may be employed if necessary to contol the flow of run-off water from 1 to 2 preventing loss to adjacent areas. To prevent undue flooding of benched area 2 during a heavy rainfall spillways 5 are placed as needed in berm 3. In most instances a sufficient supply of moisture is entrapped under the asphalt coating to sustain the crop growth on the contributing area throughout the growing season. This, however, is supplemented by lateral migration of water underneath the asphalt coating during periods of surface saturation. This inflow is shown represented by arrows 6. When saturation conditions cease lateral flow is essentially non-existent or at least reduced to a minute fraction of the former flow and this moisture is entrapped beneath the coating. In one embodiment the replenishment of water under the coated area is increased by coating the contributing area with narrow strips, i.e. 2 to 15 inches, of asphalt along the seed rows therein which alternate with uncoated strips left open to receive moisture. When this embodiment is employed the run-off from a given contributing area is accordingly decreased and the ratio of the contributing area to the benched area must be increased so that such ratio is in the range of about 3–6:1. In another embodiment the conservation of the moisture directed to the benched area is protected by a similar stripping of the seed rows in the benched area.

Crops in semi-arid regions are preferably established as row crops with such rows spaced apart a distance in the range of about 12 to 48 inches, preferably 22 to 42 inches to conserve moisture.

The film over the seed row should be a continuous one, essentially impenetrable by water or water vapor and of a thickness and consistency suitable for penetration by young plants or seedlings. The asphalt emulsion may be applied by any method suitable for leaving a thin continuous film over the seed bed. The preferred method for effecting this application is by spraying, employing either conventional pressure or air atomization techniques.

Asphalt emulsions which are suitable for use with this invention may be either acidic (cationic) or basic (anionic) although the acid emulsions are preferred. Both are asphalt in water emulsions. Typical specifications for both types are listed in the following table.

TABLE I

CHARACTERISTICS AND COMPOSITION OF ACIDIC AND BASIC EMULSIONS

|  | Basic | Acidic |
|---|---|---|
| Emulsion Characteristics: |  |  |
| Viscosity, Saybolt Fural at 77° F. | 20–200 | 20–200 |
| Residue (by distillation), wt. percent | 57–70 | 57–70 |
| Settlement, 5 days, wt. percent | 0–3 | 0–3 |
| Residue Characteristics: |  |  |
| Penetration at 77° F., 100 g., 5 sec | 85–200 | 10–200 |
| Solubility in CS₂, percent | 97+ | 97+ |
| Ductility at 77° F., cm | 40+ | 40+ |
| Softening Point, °F. | 100–125 | 100–175 |
| Composition, Wt. percent: |  |  |
| Water | 30–43 | 30–43 |
| Asphalt | 57–70 | 57–70 |
| Emulsifier (preferred-polyamines for acidic emulsions, fatty acids for basic) |  |  |
| NaOH | 0.6–0.8 |  |
| HCl (36%) |  | 0.1–0.4 |

While the above represents characteristics of acidic and basic emulsions, it is to be understood that these limits may be varied; for example, the water in the composition may be as high as 50 to 55% by weight. On the other hand, the residue or lower limit of asphalt in the concentrate may be as low as 25 or 50% by weight.

Other petroleum products may be used in lieu of asphalt in these emulsions or as non-emulsified liquids providing they are of a suitable viscosity for application by spraying, form a continuous film which is penetrable to young seedlings but essentially impenetrable to water, and do not possess a high degree of herbicidal properties. Suitable petroleum products for this use include crude oils low in sulfur content, petroleum waxes, wax and asphalt mixes, residua etc.

Suitable emulsifying agents for use in preparing these emulsions include the following:

Cationic agents:

(1) Primary, secondary, tertiary, and polyamine salts such as the diamine dichloride

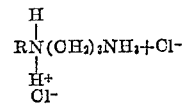

where R is an alkyl chain with 16–18 carbon atoms. In general, the alkyl chains of the amines may contain 8–22 carbon atoms with 14–18 being preferred.

(2) Amines such as those used in forming the salts of (1) condensed with 1–10 moles of ethylene oxide per mole of amine such as

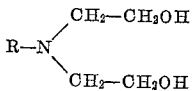

where R is as defined in (1).

(3) Quaternary ammonium salts such as $$[R_3-N]+Cl-$$

(4) Dimethylated amine salts such as

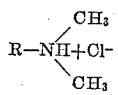

(5) Aromatic amine salts and cyclic amine salts.
(6) 2-imidazoline.

Anionic agents:
Alkali metal salts of fatty acids such as

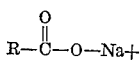

where R is an alkyl chain with 8–22 carbon atoms, preferably 14–18. The potassium salt may also be used. Also, the emulsifying agent is not always one specific compound but could be a mixture of salts of fatty acids in which R varied in length. Examples of these are a sodium salt of pine wood lignin and a salt of a long chain acid resin from the destructive distillation of pine wood stumps; also fine clays such as bentonite can be used.

Whereas, the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid (CH₃COOH) or nitric acid (HNO₃) could be used instead of HCl on a mole per mole basis. Also, KOH could be used instead of NaOH although the latter is cheaper.

For the purposes of this invention the emulsions set forth in Table I may, for want of a better term, be referred to as emulsion concentrates. For the purposes of this invention such emulsions are further diluted with 0.8 to 3 parts of water prior to application. In general, the range of dilution should be such that the asphalt content of the mulch is preferably between about 25% and 65% by weight. For minimizing evaporation losses with soils in general it has been found that optimum results are obtained when about 0.8 to 1.70, preferably about 1.3, parts of water are employed per equivalent volume of emulsion concentrate. More specifically, maximum effectiveness in retarding evaporation from a silt loam type soil while using a minimum amount of emulsion is obtained by spraying onto the soil an emulsion as characterized in Table I diluted to the extent of 1.18±0.25 to 1.47±0.25 volumes of water per volume of emulsion, such dilution increasing linearly from the low dilution to the higher dilution as the soil density decreases from about 1.60 to 1.20 gm./cm.³. These emulsions may be prepared in the conventional manner as follows:

The emulsifying solution of the desired formulation at a temperature of 120 to 150° F. and the asphalt at a temperature of about 240° F. may be fed in separate streams to a conventional colloid mill. Other conventional techniques for effecting emulsification may be employed if colloid milling is not convenient. The preferred emulsification temperature is about 180°–190° F. A thin continuous film of such emulsions will retard evaporation rate by 90 to 99% as compared to bare soil. Such emulsions (based on undiluted emulsion concentrate) should be applied at a rate in the range of 150 to 1000, preferably 300 to 750 gal. per acre of coverage. Under certain conditions it may be desirable to apply the asphalt emulsion in strips. Under these conidtions, it may be possible to use as little as 30 gals./acre; for example, if the strips are from 2 to 15 inches wide.

In addition to grass crops, this invention may be used to grow almost any type of row crop such as sugar beets, corn, potatoes, sorghums, cotton, soybeans, and vegetables of a truck farming operation. It is particularly adapted for use with crops which do not require cultivation during the growing season.

*Example 1*

An asphalt emulsion was prepared in the following manner:

An emulsifying solution was first prepared by mixing the ingredients set forth in the following formulation:

| | Percent |
|---|---|
| Indulin C (1) | 2.6 |
| Vinsol (2) | 3.6 |
| NaOH | 0.72 |
| Water | 93.1 |

(1) A sodium salt of a pine wood lignin.
(2) Long chain acid resin from the destructive distillation of pine wood stumps.

The emulsifying solution and asphalt having the following characteristics,

| | |
|---|---|
| Penetration @ 77° F., 100 g., 5 sec | 143 |
| Softening point, ° F | 110 |
| Viscosity, S.S.F. @ 275° F | 209 |
| Ductility @ 77° F | 45 | were emulsified at about 190° F. by passing a stream of the emulsifying solution at about 140° F. and a stream of such asphalt at about 240° F. through a colloid mill. The emulsion thus prepared was examined and found to have the following characteristics:

| | |
|---|---|
| Viscosity, S.S.F. @ 77° F | 31 |
| Residue by distillation, percent | 60 |
| Sieve test (retention on #20 sieve), percent | 01– |

*Example 2*

An emulsion is prepared as in Example 1 except that the emulsifying agent employed was the potassium salt of a fatty acid having the formula

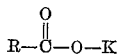

wherein R is an alkyl chain containing 15 carbon atoms.

*Example 3*

The increase obtainable from benching alone is demonstrated by comparing the yield from a benched area receiving run-off from a contributing area with the yield of a level area of the same size receiving only the rain falling directly thereon. The increase in yield on a sloping, contributing area which is obtainable from coating the seed bed thereon with a continuous film of the asphalt emulsion prepared in Example 1 is demonstrated by seeding a contributing area and coating only a portion of these with a continuous film of such emulsion. With these results, the increase in yield obtainable by the combination of this invention can be demonstrated.

Tests are made in a semi-arid area receiving an average rainfall of 17 inches per year, the major fraction of which occurs in the early spring and summer seasons. Crops of sorghum grain are planted on the various test plots as hereinafter set forth and the yields for 5 growing seasons from each test plot are averaged. The test area in each case is one acre. Where a portion of the area is benched the fraction of the acre so employed is one-third of an acre. The asphalt emulsion employed is the asphalt emulsion of Example 1 diluted with 1.3 parts of water per part of such emulsion. The rate of application of such emulsion is 500 gallons of undiluted emulsion per acre actually coated. Test plot I is a one acre level field receiving no run-off water from adjacent areas. Test plot II is a two-part field. The first part comprises a ⅓ acre benched area located to receive run-off moisture from the second part, a sloping contributing area comprising ⅔ of an acre. Test plot III is a two-part field such as plot II except that the ⅔ acre portion is coated as hereinbefore described and the ⅓ acre portion is so positioned so as to receive no run-off water. Test plot IV is also a two-part field wherein the ⅔ acre portion is coated as in plot III and the ⅓ acre portion is benched as in plot II, i.e. located to receive run-off from the coated area.

The following table illustrates representative results that are obtained from the various combinations and demonstrates the synergistic effect on yields obtainable with this invention.

TABLE II

| Test Plot Field Condition | Yields, Bu./Acre (Grain Sorghum) | | |
|---|---|---|---|
| | Contributing Area | Benched Area | Total |
| Natural Non-Coated, Not Benched (level field) | 26 (⅔ of 40) | 14 (⅓ of 40) | 40 |
| Non-Coated (⅔ acre), Benched (⅓ acre) | 26 (⅔ of 40) | 27 (⅓ of 80) | 53 |
| Coated (⅔ acre), Not Benched (⅓ acre), no drain | 84 | 13 | 97 |
| Coated (⅔ acre), Benched (⅓ acre) | 84 | 42 | 126 |

*Example 4*

The emulsions of Example 1 were applied in a continuous film over a plot seeded with grass seed, blue grama. The application rate was 750 gallons per acre of soil covered. Control plots were planted adjacent to the coated plots but left uncoated. The moisture content of the soil at the time of seeding was the same for each plot. Rains of 0.71 and 0.35 inch fell on the plots at 23 and 27 days after seeding. The plots were examined at 10 and 45 days after seeding. At the 10 day examination a vigorous growth of seedlings had appeared through the asphalt film to a height of several centimeters. At the 10 day examination the uncoated plots showed no evidence of emerging seedlings. At the 45 day examination, the blue grama plants in the coated area were well established. Seedlings which appeared in the control plots after the rainfalls 23 and 27 days after planting were struggling to survive at the 45 day examination.

If desired, varying amounts of fertilizer including nitrogen, phosphorus and potash types may be included in the aqueous phase of the emulsion. Ammonium hydroxide provides a valuable soil nutrient and may be used in lieu of sodium hydroxide in basic emulsions. Incorporation of small amounts of sodium silicate may also be found useful in some embodiments.

What is claimed is:

1. A method for maximizing crop yields which comprises in combination applying to a seeded contributing area which drains to a receiving seed bed of lesser area than said contributing area a coating comprising a continuous film of a petroleum based aqueous emulsion, which film is essentially impenetrable to water and of a thickness and consistency penetrable by young seedlings, said application being made while moisture content of said contributing area is relatively high, thereby diverting rainfall which occurs subsequent to said application from said contributing area to said receiving seed bed, and establishing means to confine drainage from said contributing area to said receiving seed bed.

2. A method in accordance with claim 1 wherein said emulsion is applied to said contributing area at a rate in the range of 150 to 1000 gallons per acre.

3. A method for increasing the total crop yield of an area of land containing a sloping contributing area having a first seed bed and a lower adjacent receiving area having a second seed bed which comprises in combination applying to said first seed bed 150 to 1000 gallons per acre of an asphalt comprising emulsion consisting essentially of an emulsion concentrate having a viscosity at 77° F. of 20 to 200 S.S.U. containing about 30 to 43 weight percent water, about 57 to 70 weight percent asphalt, and an emulsifying agent, diluted with 0.8 to 3.0 volumes of water per volume of said concentrate in the form of a continuous film which is essentially impenetrable to water and of a thickness penetrable to young seedlings, and diverting water which falls on said film to said second seed bed.

4. A method in accordance with claim 3 wherein the rate of application of the diluted concentrate is in the range of 300 to 700 gallons per acre.

5. A method in accordance with claim 3 wherein said emulsion concentrate contains between 0.035 and 0.2 weight percent hydrogen chloride.

6. A method in accordance with claim 3 wherein said emulsion concentrate contains between 0.1 and 1.0 weight percent NaOH.

7. In a method for maximizing crop yields which comprises applying a coating over a seeded portion of a seed bed to conserve moisture therein, the improvement which comprises applying to said portion at a rate in the range of 150 to 1000 gallons per acre of asphalt-comprising emulsion consisting essentially of an HCl containing emulsion concentrate having a viscosity at 77° F. of 20 to 200 S.S.U., containing about 30 to 43 weight percent water, about 57 to 70 weight percent of an asphalt having a softening point in the range of 100° to 175° F., and an emulsifying agent diluted with from 0.8 to 3.0 volumes of water per volume of said concentrate, thereby forming a continuous film which is essentially impenetrable to water and of a thickness penetrable to young seedlings.

8. A method in accordance with claim 7 wherein said rate of application is in the range of 300 to 750 gallons per acre.

9. In a method in accordance with claim 7 wherein said emulsion concentrate is diluted with 0.8 to 1.7 volumes of water per volume of said concentrate.

10. In a method for maximizing crop yields which comprises applying a coating over a seeded portion of a seed bed to conserve moisture therein, the improvement which comprises applying to said portion at a rate in the range of 150 to 1000 gallons per acre of asphalt-comprising emulsion consisting essentially of an NaOH containing emulsion concentrate having a viscosity at 77° F. of 20 to 200 S.S.U., containing about 30 to 43 weight percent water, about 57 to 70 weight percent of an asphalt having a softening point in the range of 100° to 175° F., and an emulsifying agent diluted with from 0.8 to 3.0 volumes of water per volume of said concentrate, thereby forming a continuous film which is essentially impenetrable to water and of a thickness penetrable to young seedlings.

11. In a method for maximizing crop yields which comprises applying a coating over a seeded portion of a seed bed to conserve moisture therein, the improvement which comprises applying to said portion at a rate in the range of 30 to 1000 gallons per acre of asphalt-comprising emulsion having a viscosity at 77° F. of 20 to 200 S.S.U., containing from about 20 to 55 weight percent water, about 45 to 70 weight percent of an asphalt having a softening point in the range from 100 to 175° F., and an emulsifying agent diluted such that the asphalt content of the mulch is between about 25% and 60% by weight, thereby forming a continuous film which is essentially impenetrable to water and of a thickness penetrable to young seedlings.

12. A method in accordance with claim 11 wherein said emulsion is an acidic emulsion.

(References on following page)

References Cited in the file of this patent

UNITED STATES PATENTS

| | | |
|---|---|---|
| 2,333,959 | Smith | Nov. 9, 1943 |
| 2,927,402 | Goren | Mar. 8, 1960 |

OTHER REFERENCES

Myers, "Some Experience with Asphalt in the Establishment of Grasses and Legumes for Erosion Control," published 1941 in Soil Society of America Proceedings, 1941, vol. 6, pages 459 through 461.

Garmshausen, "Asphalt Mulch," published February 1951 in Roads and Streets (magazine), vol. 94, No. 2, pp. 80, 82, 84 and 86.

H. M. Smith, "The Effect of Asphalt Mulches on the Stabilization, of Soils and Aggregate Materials," an abstract of a thesis, at Univ. of Illinois, Urbana, Ill., eight pages.